United States Patent Office 3,600,464
Patented Aug. 17, 1971

3,600,464
SOLVENT RESISTANT VINYL-PYRIDINE BLOCK POLYMER DERIVATIVES AND THEIR PREPARATION
Ralph H. Bauer, Huntington Beach, and Alfred W. Shaw, Moraga, Calif., assignors to Shell Oil Company, New York, N.Y.
No Drawing. Continuation-in-part of application Ser. No. 361,256, Apr. 20, 1964. This application Oct. 3, 1968, Ser. No. 764,929
Int. Cl. C08f $15/02$
U.S. Cl. 260—879                                5 Claims

ABSTRACT OF THE DISCLOSURE

Novel block copolymer derivatives, resistant to non-polar organic solvents, are disclosed. These comprise block copolymers of the group consisting of block copolymers having at least three polymer blocks, at least two of the blocks being polymerized vinyl-pyridine compounds, dissimilar to the adjacent blocks, and at least one of the blocks being polymerized conjugated diene, and hydrogenated derivatives the copolymers, at least 50% of the heterocyclic nitrogen atoms being reaction products with mineral acids.

---

This is a continuation-in-part of our copending application, Ser. No. 361,256, filed Apr. 20, 1964 now abandoned.

This invention is directed to insolubilizing certain block copolymers containing polymer blocks of vinyl-substituted nitrogen containing compounds. Moreover, it is concerned with processes for the preparation of insoluble derivatives of the block copolymers.

The preparation of certain block copolymers has received intensive study in the recent past. A wide variety of such block copolymers has been prepared. The products obtained will depend, first, upon the monomers employed for the individual block and, secondly, upon the molecular weight of each of the blocks. Thus, it is understandable that block copolymers having either elastomeric properties, or some of both may be obtained by the wide variation possible.

One of the surprising features of the block copolymers particularly when suitable block molecular weights are utilized is the so-called "self-curing" property by which is meant that block copolymers having certain block relationships exhibit the physical properties of cured normal rubbers with respect to their stress-strain properties. However, many of them possess one limitation which it would be desirable to improve: since they have not been treated with the traditional vulcanizing agents and thereby insolubilized, they possess low resistance to the usual non-polar organic solvents.

It is an object of the present invention to provide improved block copolymers. It is a further object of the invention to provide a process for the preparation of such improved block copolymers. It is a particular object of the invention to provide a process for the preparation of improved block copolymers showing reduced solvent sensitivity. Other objects will become apparent during the following detailed description of the invention.

Now, in accordance with the present invention, a process is provided for substantially reducing the solvent sensitivity of certain block polymers, said block polymers comprising those containing at least 3 polymer blocks, each block being dissimilar to adjacent blocks and two of which at least are polymer blocks of nitrogen compounds containing at least one vinyl group, and at least one of which is a polymer block of a conjugated diene, as well as hydrogenated products of such block polymers. The process comprises treating the shaped block polymer with mineral acids. The treatment so performed results in conversion of at least 50% of the nitrogen atoms to derivatives which are salt-like or covalent in nature. The resulting products have been found to be surprisingly resistant to the action of ordinary non-polar organic solvents as more fully described hereinafter.

Still in accordance with the present invention, new block polymers are provided comprising the salt derivatives or covalent compounds of the block polymers having the blocks as described hereinbefore wherein the modifying radicals are bonded by coulombic or coordinate bonds to at least about 50% of the heterocyclic nitrogen atoms.

The process of forming the original block copolymer prior to its treatment with mineral acids does not form a part of the present invention. The block copolymers considered here are those containing 3 or more polymer blocks at least two of which are polymer blocks of nitrogen-containing monomers containing at least one vinyl (including alpha methyl vinyl) group. For convenience, reference will be made particularly to the most desirable type of block copolymer having the general configuration $$A—B—(B—A)_{1-5}$$

wherein each A is a polymer block of the vinyl nitrogen-containing monomer and B is a polymer block of a conjugated diene, and adjacent B blocks are treated as a single block segment. However, it will be understood that block copolymers are contemplated containing repeated dissimilar block segments, the total number of such segments being 3–100 or even more but usually 3–10. Suitable species from which heterocyclic polymer blocks may be formed include 2-vinyl pyridine, 3-vinyl pyridine, 4-vinyl pyridine, 3 - ethyl - 5-vinyl pyridine, 3,5-diethyl-4-vinyl pyridine, and similar mono- and disubstituted alkyl vinyl pyridines.

The conjugated dienes utilized for the formation of polymer blocks separating the polymer blocks of vinyl heterocyclics are typified by those having from 4 to 12 carbon atoms and preferably 4–8 carbon atoms, such as 1,3-butadiene, isoprene, methyl pentadiene, phenyl butadiene, 3,4-dimethyl-1-, 3-hexadiene, 4,5-diethyl-1,3-octadiene, 2,3-dimethylbutadiene, etc., as well as mixtures of the same, such as mixtures of butadiene and isoprene.

Several processes are available for the formation of such block polymers. One method comprises the use of dialkali metal substituted hydrocarbons, preferably dilithium hydrocarbons, thus forming an initial polymer block terminated at both ends with an alkali metal radical. Thereafter, upon the addition of a second type of monomer, polymerization continues to form a block coplymer having polymer blocks on either end of the initial polymer block, thus resulting in the general structure $$A—B—(B—A)_{1-5}$$

Another process comprises a coupling reaction wherein the initial living polymer is formed in the presence of a dialkyl hydrocarbon initiator, a second monomer is added to form intermediate polymer blocks on either end of the resulting living polymer and thereafter adding a coupling agent to effect coupling of the intermediate living block copolymers so formed. Suitable coupling agents are dihalohydrocarbons such as dibromoethane, dichloropropane and esters of a monohydric alcohol and a dicarboxylic acid such as diethyl oxalate, dimethyl adipate or isopropyl phthalate.

Referring now to the preferred type of block copolymer having the general configuration $$A—B—(B—A)_{1-5}$$

the objectives of the present invention and eventual utility of the products so derived can be best achieved by a balance of molecular weight in each of the individual polymer blocks. For most purposes, the block copolymers contemplated herewith are especially useful for either elastomeric end uses or for thermoplastic end uses. The set of physical properties generally defining each of these areas may be obtained to a striking degree by balancing the ratio of conjugated diene polymer blocks and their molecular weights to the blocks derived from vinyl nitrogen containing monomers, and their respective molecular weights. In general, it can be stated that the higher the weight ratio of condensed vinyl pyridine monomer units to conjugated diene units, the more plastic-like the products become. On the other hand, as the conjugated diene units increase in ratio to the second type of monomer, the more elastomeric the products are.

Preferably, the non-elastomeric blocks comprising the polymer blocks of vinyl pyridine compounds have average molecular weights between about 1,000 and 115,000 while the elastomeric blocks prepared from conjugated dienes preferably have average molecular weights between about 20,000 and 450,000. Of course, it is possible to prepare block copolymers having individual block molecular weights beyond these limits for special purposes. For elastomeric end uses, it is preferred that the polymer blocks of vinylpyridine monomers comprise 10 to about 40% of the total block copolymer and preferably 15 to about 33%. For thermoplastic end uses the proportion of such polymer blocks may be substantially increased to 80% or higher. The best results are obtained, especially for elastomeric purposes when vinyl pyridine polymer blocks have preferred molecular weight ranges between about 8,000 and 60,000 while the blocks of conjugated diene polymers should have average molecular weights of 50,000 to 300,000. Typical individual species of block copolymers especially contemplated are represented by the following:

poly(2-vinyl pyridine)-polyisoprene-poly(2-vinylpyridine)
poly(3-vinyl pyridine)-polymethyl pentadiene-poly(3-vinyl pyridine)
poly(3-vinyl pyridine)-polybutadiene-poly(4-vinyl pyridine)
poly(3-ethyl-5-vinyl pyridine)-polybutadiene-poly(3,5-diethyl-4-vinyl pyridine)
poly(2-vinyl pyridine)-4,5-diethyl-1,3-octadiene-poly(2-vinyl pyridine)

In addition to the block copolymers just described, the starting materials utilized in the formation of the solvent resistant polymers may be hydrogenation products of the above described polymers. The hydrogenation may be either partial or complete dependent upon the end use contemplated. Hydrogenation normally results in several benefits, mainly with respect to reduction in oxygen and ozone sensitivity, increase in second order transition temperatures and an increase in the base strength of the nitrogen radicals. Thus, the reduction of the unsaturation in the conjugated diene polymer blocks substantially improves the oxidation and light resistance of the polymers.

Hydrogenation is effected by any one of a number of catalytic systems such as nickel on kieselguhr, platinum on diatomaceous earth and more especially the use of cobalt, nickel or molybdenum compounds reduced with aluminum reducing agents. Typical of these is the reaction product of cobalt or nickel carboxylates with aluminum trialkyls, the aluminum compound being present in molar excess. Hydrogenation is conducted under a wide range of temperatures dependent upon the extent of hydrogenation desired and the relative activity of the catalyst system employed. The least active of the catalysts referred to above is nickel on kieselguhr, while the most active class comprises the nickel or cobalt carboxylates reduced with aluminum trialkyls. It has been found in the use of the latter type of system that selective hydrogenation is possible. The conjugated diene polymer blocks hydrogenate rapidly and completely under very mild hydrogenation conditions while the heterocyclic polymer blocks require more stringent hydrogenation conditions.

The above-described class of block copolymers are to be treated with certain mineral acids which react with the heterocyclic nitrogen atoms to form coulombic bonds due to salt formation. While hydrogen halides such as hydrogen chloride are preferred for this purpose, other acidic materials forming coordinate complexes or covalent bonds with the nitrogen atoms may be utilized.

The treatment of the polymer is preferably carried out after the polymer has been shaped to form a desired article. Alternatively, solvent casting may be employed. Anti-scorch agents may be incorporated to minimize conversion to the insoluble form until a certain temperature is reached. Such materials would include amines, ammonia or carboxylates.

The first step in the preferred process of the present invention is to shape the polymer into a desired article form and thereafter expose it to an atmosphere (either gaseous, liquid or solution) of the modifying agents. The form will be of a diverse nature such as thread, fiber, film, foam, and other shapes and articles as desired. The thinner the article, of course, the greater the degree of penetration of the agent will be under a given set of conditions. In many instances, however, it is unnecessary to convert the entire body of the polymer since the main objective is to reduce the solvent sensitivity of the surface thereof. By surface is meant an effective depth of polymer such that the remaining body of the polymer will be effectively protected from swelling or solution in solvents with which the body may come in contact. Normally this would be a relatively superficial depth in the order of 1 or 2 millimeters at most. In many articles, this will include the entire body such as with many foams, fibers and films. For heavier, larger articles, such as gaskets, shoe soles, and the like, only 1–2 millimeters of the surface will and need be treated or effected by the agents in order to improve the solvent resistance of the entire article. Insofar as the 1–2 millimeter depth is concerned, however, it is preferred to convert at least about 50% and preferably more than about 65% of the nitrogen atoms with the agent so as to substantially reduce the non-polar organic solvent sensitivity of the product. Moreover, it should be emphasized that the process of the present invention entails the treatment of the previously formed and shaped polymer and is not concerned with the coupling of polymer segments. The latter process of coupling would be performed prior to any shaping operation and would not result in the benefits of the present invention, which require treatment of the preformed polymer which has also been shaped as described above prior to the treatment with the halogen containing agent.

The treatment is preferably carried out at temperatures ranging from about 0 to about 150° C. for periods of time from about 1/10 to 48 hours. Longer times of treatment may be utilized if storage of the product during the treatment is no major problem. Furthermore, with extremely active compounds, times shorter than 1/10 of an hour may be employed, especially if the temperature and pressure conditions are such as to promote a rapid course of the reaction. With gaseous compounds, such as the hydrogen halides and the like, it is preferred to utilize pressures varying from about 1 atmosphere to 1000 atmospheres. A typical process would comprise the extrusion of a film of the untreated but completely polymerized block copolymer and then contacting the preformed film with an atmosphere of hydrogen chloride under conditions to form the hydrochloride salt of at least 50% of the nitrogen radicals. The class of materials mentioned previously which result in improved solvent resistance may also be added prior to shaping of the article providing a suitable inhibitor such as an electron donating compound is added. Typical material include amines, acid salts and ethers. About 10–150 mol percent based on the treating agent is suitable. The polymer may then be processed and the subsequent insolubilizing step may take place at a predetermined temperature and time.

The treatment of the subject class of block copolymers with the acidic materials results in a substantial reduction or virtual elimination of their sensitivity toward non-polar organic solvents, such as toluene, benzene chloroform and the like. This is accompanied by no material disadvantageous alteration in the other physical properties of the block copolymers. The relationship in this respect is in sharp variance with copolymers which are first treated with the agents and thereafter subjected to masticating or shaping operation in the absence of an inhibitor.

In addition, the treated block copolymers, according to the invention are made more sensitive toward highly polar solvents such as water. Accordingly, these derivatives can be usefully combined with other materials to produce articles dependent upon swelling when contacted with polar solvents. For example, films of these materials are suited for use in water purification such as desalinization of brackish water or brine by the so-called membrane types of processes. These processes remove either salt from saline water or water from salt by passing saline water through the membrane. The processes include electrodialysis, reversed osmosis, thermal osmosis and related processes as well as their combination.

Owing to their elastomeric as well as swelling properties these materials can be usefully employed in water tight gaskets, for example, around windows in automobiles, seals around the floating roofs of large storage tanks and the like.

The following examples illustrate the advantages gained by use of the process of the present invention:

EXAMPLE I

A block copolymer was prepared having the configuration poly(2 - vinyl pyridine)polybutadiene-poly(2 - vinyl pyridine), the block molecular weights being 15,000–100,000–15,000. This polymer at room temperature was badly swollen by iso-octane, dissolved in toluene and in chloroform. The polymer was cast in sheet form and contacted with an atmosphere of hydrogen chloride gas at room temperature for 30 hours and then re-tested for its solubility characteristics. It was found to be substantially less swollen by iso-octane and was no longer soluble in either toluene or chloroform. Analysis showed that about 85% of the pyridine nitrogen atoms were in the form of the hydrochloride salt.

EXAMPLE II

A block copolymer was formed having the configuration poly(4-vinylpyridine)polybutadiene - poly(4-vinyl pyridine), having block molecular weights of 3,000–99,000–3,000. This polymer was treated with an atmosphere of hydrogen chloride gas at room temperature for 30 hours. Analysis showed that about 80% of the pyridine nitrogen atoms were in the form of the hydrochloride salt.

The physical properties of the polymer both before and after treatment were tested with the following results:

TABLE I

| | Original polymer | HCl treated polymer |
|---|---|---|
| Tensile strength at break | 850 | 1,925 |
| Modulus, 300% | 175 | 600 |
| Modulus, 500% | 300 | 1,700 |
| Elongation at break | 750 | 525 |
| Set at break | 15 | 10 |

The untreated polymer dissolved in benzene while the HCl treated product was not dissolved by the same solvent. It will be noted that the treatment not only improved its solvent resistance but also substantially improved its tensile strength and increased the modulus of the product.

We claim as our invention:
1. The process for the preparation of a toluene-resistant shaped article of block copolymer wich comprises:
 (a) shaping a block copolymer into said article having a surface, said block copolymer being selected from those having the general configuration

$$A\text{—}B\text{—}(B\text{—}A)_{1-5}$$

wherein each A is a vinyl pyridine polymer block segment having a molecular weight of 8,000 to 60,000 and B is a polymer block of a conjugated diene and adjacent B blocks are treated as a single polymer block segment having a molecular weight of 50,000 to 300,000, hydrogenated derivatives thereof and mixtures of the same;
 (b) and exposing said shaped article to an atmosphere of a hydrogen halide for 1/10–48 hours at 0–150° C., whereby at least 50% of the vinyl pyridine nitrogen radicals in said surface to a depth of 1–2 millimeters is converted to the hydrogen halide salt.

2. The process as in claim 1 wherein the hydrogen halide is hydrogen chloride.

3. The process as in claim 1 wherein the block copolymer is a copolymer of 2-vinyl pyridine and butadiene.

4. A process as in claim 1 wherein at least 65% of the pyridine nitrogen in said surface is converted to the hydrogen halide salt.

5. A process as in claim 1 wherein said block copolymer to be shaped is hydrogenated.

References Cited

UNITED STATES PATENTS

| 2,991,258 | 7/1961 | Nobbs et al. | 260—4 |
| 3,078,254 | 2/1963 | Zelinski et al. | 260—45.5 |
| 3,135,716 | 6/1964 | Uraneck | 260—45.5 |
| 3,410,838 | 11/1968 | Strobel | 260—94.7 |

JOSEPH L. SCHOFER, Primary Examiner

R. A. GAITHER, Assistant Examiner

U.S. Cl. X.R.

260—895